United States Patent
Lin et al.

(10) Patent No.: US 11,827,231 B2
(45) Date of Patent: Nov. 28, 2023

(54) SYSTEM AND METHOD FOR EVALUATING VEHICLE-TRAILER COMBINATION FOR TRAILER SWAY POTENTIAL USING ACTIVE YAW MANEUVER

(71) Applicant: GM GLOBAL TECHNOLOGY OPERATIONS LLC, Detroit, MI (US)

(72) Inventors: Wen-Chiao Lin, Rochester Hills, MI (US); Bo Yu, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 330 days.

(21) Appl. No.: 17/134,620

(22) Filed: Dec. 28, 2020

(65) Prior Publication Data

US 2022/0203999 A1    Jun. 30, 2022

(51) Int. Cl.
| | | |
|---|---|---|
| *B60W 40/114* | (2012.01) | |
| *B62D 13/02* | (2006.01) | |
| *B60D 1/30* | (2006.01) | |
| *B60W 40/109* | (2012.01) | |

(52) U.S. Cl.
CPC ............ *B60W 40/114* (2013.01); *B60D 1/30* (2013.01); *B60W 40/109* (2013.01); *B62D 13/025* (2013.01)

(58) Field of Classification Search
CPC ..... B60W 40/114; B60W 40/109; B60D 1/30; B62D 13/025
See application file for complete search history.

(56) References Cited

U.S. PATENT DOCUMENTS

| | | | |
|---|---|---|---|
| 8,055,400 B2 | 11/2011 | Grenn | |
| 8,612,079 B2 | 12/2013 | Tang et al. | |
| 10,600,261 B2 | 3/2020 | Huang et al. | |
| 10,615,585 B2 | 4/2020 | Hu et al. | |
| 2006/0229782 A1* | 10/2006 | Deng | B62D 6/003 |
| | | | 180/443 |
| 2008/0119980 A1 | 5/2008 | Ross et al. | |
| 2009/0198425 A1* | 8/2009 | Englert | B60D 1/58 |
| | | | 701/70 |
| 2010/0042287 A1 | 2/2010 | Zhang et al. | |
| 2010/0179723 A1 | 7/2010 | Zhang et al. | |
| 2011/0178671 A1 | 7/2011 | Bae et al. | |
| 2012/0109471 A1* | 5/2012 | Wu | B60T 8/1755 |
| | | | 701/49 |
| 2012/0290168 A1 | 11/2012 | De et al. | |
| 2013/0253770 A1* | 9/2013 | Nishikawa | B60W 10/18 |
| | | | 701/1 |
| 2017/0151845 A1* | 6/2017 | Allcorn | B60T 8/1708 |
| 2019/0176873 A1 | 6/2019 | Lin et al. | |

* cited by examiner

*Primary Examiner* — Tyler J Lee
*Assistant Examiner* — Yufeng Zhang

(57) ABSTRACT

A system according to the present disclosure includes an actuator control module and a damping ratio module. The actuator control module is configured to control an actuator of a vehicle to cause the vehicle to perform a yaw maneuver by rotating about its yaw axis. The damping ratio module is configured to determine a damping ratio based on an operating parameter measured during the yaw maneuver. The operating parameter includes at least one of a yaw rate of the vehicle, a yaw rate of a trailer connected to the vehicle, a lateral acceleration of the vehicle, a lateral acceleration of the trailer, a heading angle of the vehicle, and a hitch angle between a longitudinal axis of the vehicle and a longitudinal axis of the trailer.

9 Claims, 6 Drawing Sheets

SYSTEM AND METHOD FOR EVALUATING VEHICLE-TRAILER COMBINATION FOR TRAILER SWAY POTENTIAL USING ACTIVE YAW MANEUVER

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for evaluating vehicle-trailer combinations for trailer sway potential using active yaw maneuver.

Trailer sway occurs when a trailer oscillates in a rotating or side-to-side manner about a vertical axis extending through a mounting point on a trailer hitch of a vehicle to which the trailer is connected. Several factors may cause a trailer to sway. These factors include the distribution of cargo weight in the trailer, the pressure and wear of the trailer tires, and whether a weight distribution bar is properly installed.

SUMMARY

A first example of a system according to the present disclosure includes an actuator control module and a damping ratio module. The actuator control module is configured to control an actuator of a vehicle to cause the vehicle to perform a yaw maneuver by rotating about its yaw axis. The damping ratio module is configured to determine a damping ratio based on an operating parameter measured during the yaw maneuver. The operating parameter includes at least one of a yaw rate of the vehicle, a yaw rate of a trailer connected to the vehicle, a lateral acceleration of the vehicle, a lateral acceleration of the trailer, a heading angle of the vehicle, and a hitch angle between a longitudinal axis of the vehicle and a longitudinal axis of the trailer.

In one aspect, the damping ratio module is configured to determine the damping ratio based on an operating parameter signal indicating a plurality of values of the operating parameter measured during the yaw maneuver.

In one aspect, the system further includes a filtering module configured to apply a band-pass filter to the operating parameter signal, and the damping ratio module is configured to determine the damping ratio based on the filtered operating parameter signal.

In one aspect, the system further includes an oscillation frequency module configured to generate an oscillation frequency signal indicating a frequency of oscillations in the operating parameter signal, and the filtering module is configured to determine upper and lower limits of the band-pass filter based on the oscillation frequency signal.

In one aspect, the actuator control module is configured to control the vehicle actuator to cause the vehicle to perform a first yaw maneuver when a speed of the vehicle is equal to a first speed and to perform a second yaw maneuver when the vehicle speed is at a second speed that is different than the first speed. In addition, the damping ratio module is configured to determine a first damping ratio based on first values of the operating parameter measured during the first yaw maneuver and to determine a second damping ratio based on second values the operating parameter measured during the second yaw maneuver. Furthermore, the system further includes a critical speed module configured to estimate a critical speed of the vehicle based on the first and second damping ratios and the first and second speeds. The damping ratio is less than a predetermined value when the vehicle speed is greater than or equal to the critical speed.

In one aspect, the critical speed module is configured to determine a function that characterizes a relationship between the first damping ratio and the first speed and a relationship between the second damping ratio and the second speed, and to estimate the critical speed of the vehicle using the function.

In one aspect, the system further includes a UID control module configured to control a user interface device to generate a message instructing a driver of the vehicle to inspect at least one of the vehicle and the trailer when the critical speed is less than a predetermined speed.

In one aspect, the actuator control module is configured to select the vehicle actuator from a plurality of actuators of the vehicle based on driving conditions.

In one aspect, the vehicle actuator includes at least one of a steering actuator, a friction brake, and an electric motor.

In one aspect, the actuator control module is configured to control the vehicle actuator to cause the vehicle to perform the yaw maneuver in response to an instruction from a user interface device.

A second example of a system according to the present disclosure includes a damping ratio module and a UID control module. The damping ratio module is configured to determine a damping ratio based on a yaw rate signal indicating a plurality of yaw rates of a vehicle measured while the vehicle performs a yaw maneuver by rotating about its yaw axis. The UID control module is configured to control a user interface device to generate a message indicating a sway tendency of a trailer connected to the vehicle based on the damping ratio.

In one aspect, the UID control module is configured to control the user interface device to generate a message instructing a driver of the vehicle to inspect at least one of the vehicle and the trailer when the damping ratio is less than a predetermined value.

In one aspect, the system further includes a filtering module configured to apply a band-pass filter to the yaw rate signal, and the damping ratio module is configured to determine the damping ratio based on the filtered yaw rate signal.

In one aspect, the system further includes an oscillation frequency module configured to generate an oscillation frequency signal indicating a frequency of oscillations in the yaw rate signal, and the filtering module is configured to determine upper and lower limits of the band-pass filter based on the oscillation frequency signal.

A third example of a system according to the present disclosure includes an actuator control module, a damping ratio module, and a critical speed module. The actuator control module is configured to control an actuator of a vehicle to cause the vehicle to perform a first yaw maneuver when a speed of the vehicle is within a first speed range, and to control the vehicle actuator to cause the vehicle to perform a second yaw maneuver when the vehicle speed is within a second speed range. The damping ratio module is configured to determine a first value of a damping ratio based on a first yaw rate signal indicating a first plurality of yaw rates of the vehicle measured during a first period corresponding to the first yaw maneuver, and to determine a second value of the damping ratio based on a second yaw rate signal indicating a second plurality of yaw rates of the vehicle measured during a second period corresponding to the second yaw maneuver. The critical speed module is configured to estimate a critical speed of the vehicle based on the first value, a first average speed of the vehicle during the first period, the second value, and a second average speed of the vehicle during the second period. The damping ratio is less than a first predetermined value when the vehicle speed is greater than or equal to the critical speed.

In one aspect, the system further includes a UID control module configured to control a user interface device to generate a message instructing a driver of the vehicle to inspect at least one of the vehicle and a trailer connected to the vehicle when the critical speed is less than a predetermined speed.

In one aspect, the actuator control module is configured to select the vehicle actuator from a plurality of actuators of the vehicle based on driving conditions.

In one aspect, the vehicle actuator includes at least one of a steering actuator, a friction brake, and an electric motor.

In one aspect, the critical speed module is configured to determine a first function that characterizes a relationship between the first value of the damping ratio and the first average vehicle speed and a relationship between the second value of the damping ratio and the second average vehicle speed, and estimate the critical speed of the vehicle using the first function.

In one aspect, the critical speed module is configured to determine a fitting error of the first function relative to the first and second values of the damping ratio and the first and second average vehicle speeds, and the system further includes a test procedure module configured to generate an instruction when the fitting error is greater than a second predetermined value. In response to the instruction, the actuator control module is configured to control the vehicle actuator to cause the vehicle to perform a third yaw maneuver when the vehicle speed is within a third speed range. In addition, in response to the instruction, the damping ratio module is configured to determine a third value of the damping ratio based on a third yaw rate signal indicating a third plurality of yaw rates of the vehicle measured during a third period corresponding to the third yaw maneuver. Furthermore, in response to the instruction, the critical speed module is configured to determine a second function that characterizes a relationship between the first value of the damping ratio and the first average vehicle speed, a relationship between the second value of the damping ratio and the second average vehicle speed, and a relationship between the third value of the damping ratio and a third average speed of the vehicle during the third period, and to estimate the critical speed of the vehicle using the second function.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Trailer sway may be identified in real-time using a hitch angle sensor. A hitch angle sensor measures a hitch angle, which is an angle between a longitudinal axis of a vehicle and a longitudinal axis of a trailer. The magnitude and rate of change in the hitch angle indicates the magnitude and rate of trailer sway. A hitch angle sensor adds to the cost of a vehicle. In addition, monitoring trailer sway using a hitch angle sensor is a reactive approach to identifying and preventing trailer sway.

In contrast, a system and method according to the present disclosure takes a proactive approach to identifying and preventing trailer sway by predicting a critical speed at which trailer sway may occur. In addition, the system and method may accomplish this using an input from a sensor other than a hitch angle sensor, such as a yaw rate sensor, and therefore the cost of the hitch angle sensor may be avoided. In one example, the system and method controls a steering actuator to apply impulse disturbances that cause the vehicle to perform yaw maneuvers, and calculates a damping ratio based on yaw rate data collected during each yaw maneuver. The system and method then determines a function that characterizes the relationships between the damping ratios and the average speeds of the vehicle during the corresponding yaw maneuvers. The system and method then uses this function to predict the critical speed.

Figure 1:
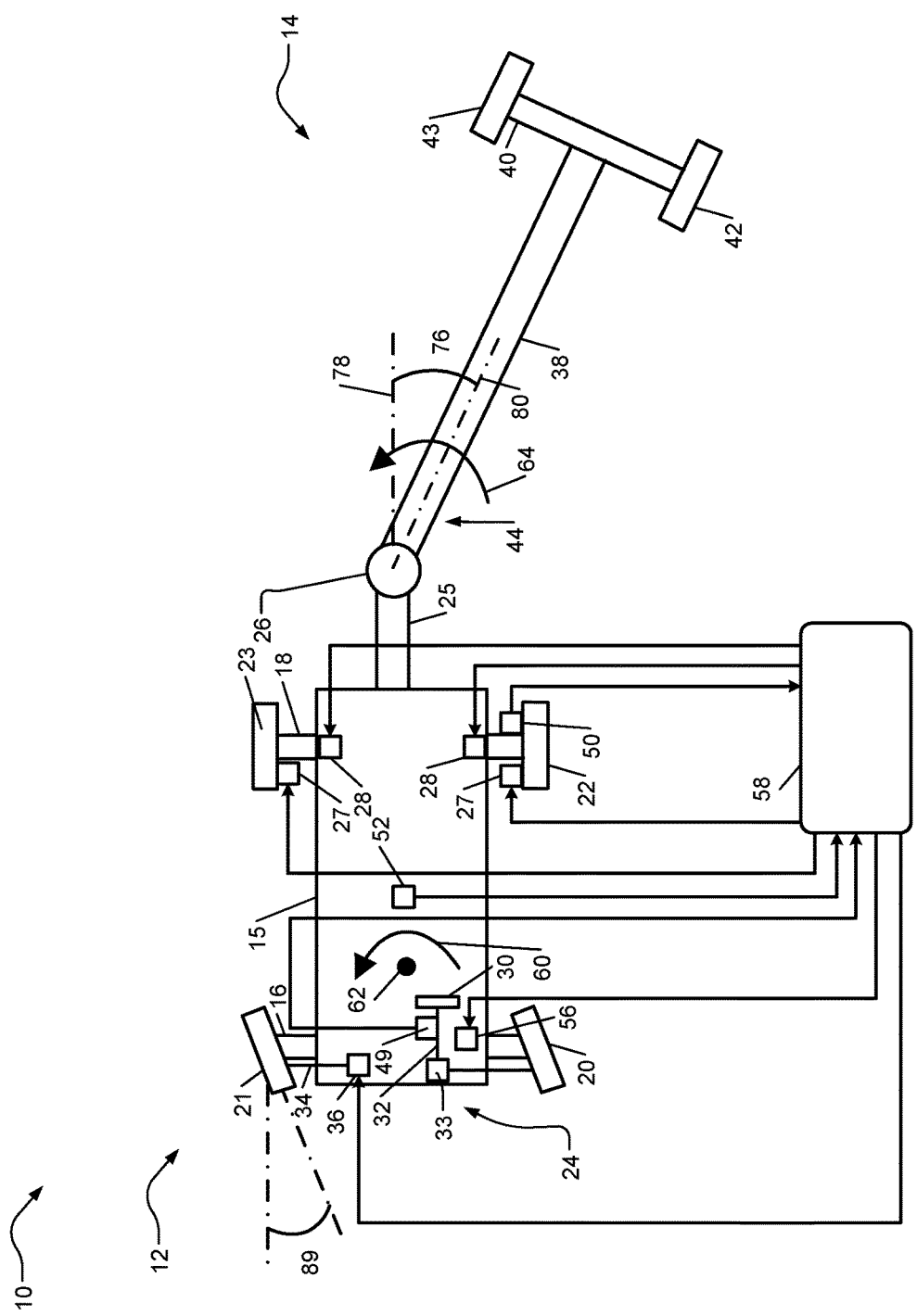
FIG. 1 is a functional block diagram of an example vehicle and trailer system according to the principles of the present disclosure.

Referring now to FIG. 1, a vehicle and trailer system 10 includes a vehicle 12 and a trailer 14. The vehicle 12 includes a frame or body 15, a front axle 16, a rear axle 18, a left front wheel 20, a right front wheel 21, a left rear wheel 22, a right rear wheel 23, a steering system 24, a trailer hitch 25 having a distal end or ball 26, friction brakes 27, and electric motors 28. In the example shown, the steering system 24 is operable to turn the left and right front wheels 20 and 21 and thereby turn the vehicle 12. In various implementations, the steering system 24 may be operable to turn the left and right rear wheels 22 and 23 and thereby turn the vehicle 12.

The steering system 24 includes a steering wheel 30, a steering column 32, a steering gear 33, a steering linkage 34, and a steering actuator 36. A driver of the vehicle 12 rotates the steering wheel 30 to turn the vehicle 12 left or right. The steering column 32 is coupled to the steering wheel 30 so that the steering column 32 rotates when the steering wheel 30 is rotated. The steering gear 33 couples the steering column 32 to the steering linkage 34 so that rotation of the steering column 32 causes translation of the steering linkage 34. The steering linkage 34 is coupled to the left and right front wheels 20 and 21 so that translation of the steering linkage 34 turns the left and right front wheels 20 and 21.

The steering actuator 36 is coupled to the steering linkage 34 and is operable to translate the steering linkage 34 and thereby turn the left and right front wheels 20 and 21. The steering actuator 36 may be a hydraulic and/or electric actuator. If the steering column 32 is coupled to the steering linkage 34 as shown in FIG. 1, the steering actuator 36 may reduce the amount of effort that the driver must exert to turn the vehicle 12 left or right. In various implementations, the steering column 32 may not be coupled to the steering linkage 34 (i.e., the steering gear 33 may be omitted), and the steering actuator 36 may translate the steering linkage 34 in response to an electronic signal that is generated based on the position of the steering wheel 30. When the steering actuator 36 is electronically controlled in this way, the steering system 24 may be referred to as a steer-by-wire system.

In the example shown in FIG. 1, the friction brakes 27 are operable to decrease the rotational speed of the left and right rear wheels 22 and 23. In addition, the electric motors 28 are operable to rotate the left and right rear wheels 22 and 23 to cause the vehicle 12 to move forward or rearward. In various implementations, the friction brakes 27 may be operable to decrease the rotational speed of the left and right front wheels 20 and 21. In addition, the electric motors 28 may be operable to rotate the left and right front wheels 20 and 21 to cause the vehicle 12 to move forward or rearward.

The trailer 14 includes a frame or body 38, an axle 40, a left wheel 42, a right wheel 43, and a tongue 44. The tongue 44 of the trailer 14 may be placed onto the ball 26 of the trailer hitch 25 of the vehicle 12 to couple the trailer 14 to the vehicle 12. The system 10 may further include a weight distribution bar (not shown) mounted on the vehicle 12. The weight distribution bar distribute parts of the weight of the trailer hitch 25 from the rear axle 18 of the vehicle 12 to the front axle 16 of the vehicle 12 and to the axle 40 of the trailer 14.

The vehicle 12 further includes a steering wheel position sensor 49, a wheel speed sensor 50, a yaw rate sensor 52, a user interface device 56, and a vehicle control module 58. The steering wheel position sensor 49 measures the angular position of the steering wheel 30. The steering wheel position sensor 49 may include a magnet mounted to the steering column 32 and a Hall effect sensor that detects the intensity of a magnetic field generated by the magnet.

The wheel speed sensor 50 measures the speed of the left rear wheel 22 of the vehicle 12. Although the wheel speed sensor 50 is shown mounted to the left rear wheel 22, the wheel speed sensor 50 may measure the speed of another wheel of the vehicle 12. In various implementations, the vehicle 12 may include multiple wheel speed sensors to measure the speeds of multiple wheels of the vehicle 12. In various implementations, the speed of the vehicle 12 may be determined based on an input from a Global Positioning System (GPS) device, in which case the wheel speed sensor 50 may be omitted. The yaw rate sensor 52 measures a yaw rate of the vehicle 12 (i.e., the rate at which the vehicle 12 rotates in a yaw direction 60 about its yaw axis 62).

The user interface device 56 is disposed within a cabin of the vehicle 12 and is operable to generate a visual message (e.g., text, a light, and/or a symbol), an audible message (e.g., a chime), and/or a tactile message (e.g., a vibration). The user interface device 56 may include an electronic display (e.g., a touchscreen), a speaker, and/or a vibrating motor. The user interface device 56 may also be operable to generate signals in response to voice or touch commands from a user of the vehicle 12.

The vehicle control module 58 controls one or more actuators of the vehicle 12, such as the friction brakes 27, the steering actuator 36, and/or the electric motors 28, to apply an impulse disturbance that causes the vehicle 12 to perform a yaw maneuver. During the yaw maneuver, the vehicle 12 rotates in the yaw direction 60 about its yaw axis 62. In one example, the vehicle control module 58 determines a damping ratio of the system 10 based on the yaw rates measured by yaw rate sensor 52 during the yaw maneuver.

In one example, the vehicle control module 58 controls the vehicle actuator(s) to perform multiple yaw maneuvers at different vehicle speeds, and determines the damping ratio for each yaw maneuver based on the yaw rates measured during that yaw maneuver. The vehicle control module 58 then determines a function that characterizes the relationships between the damping ratios and the vehicle speeds during the corresponding yaw maneuvers, and uses the function to estimate the critical speed of the vehicle 12. The critical speed of the vehicle 12 is the lowest vehicle speed at which the damping ratio of the system 10 is less than a predetermined value (e.g., 0.1), which may lead to undesired sway of the trailer 14. The trailer 14 sways when the trailer 14 rotates or oscillates in a yaw direction 64 about the ball 26 of the trailer hitch 25 on the vehicle 12.

Figure 2:
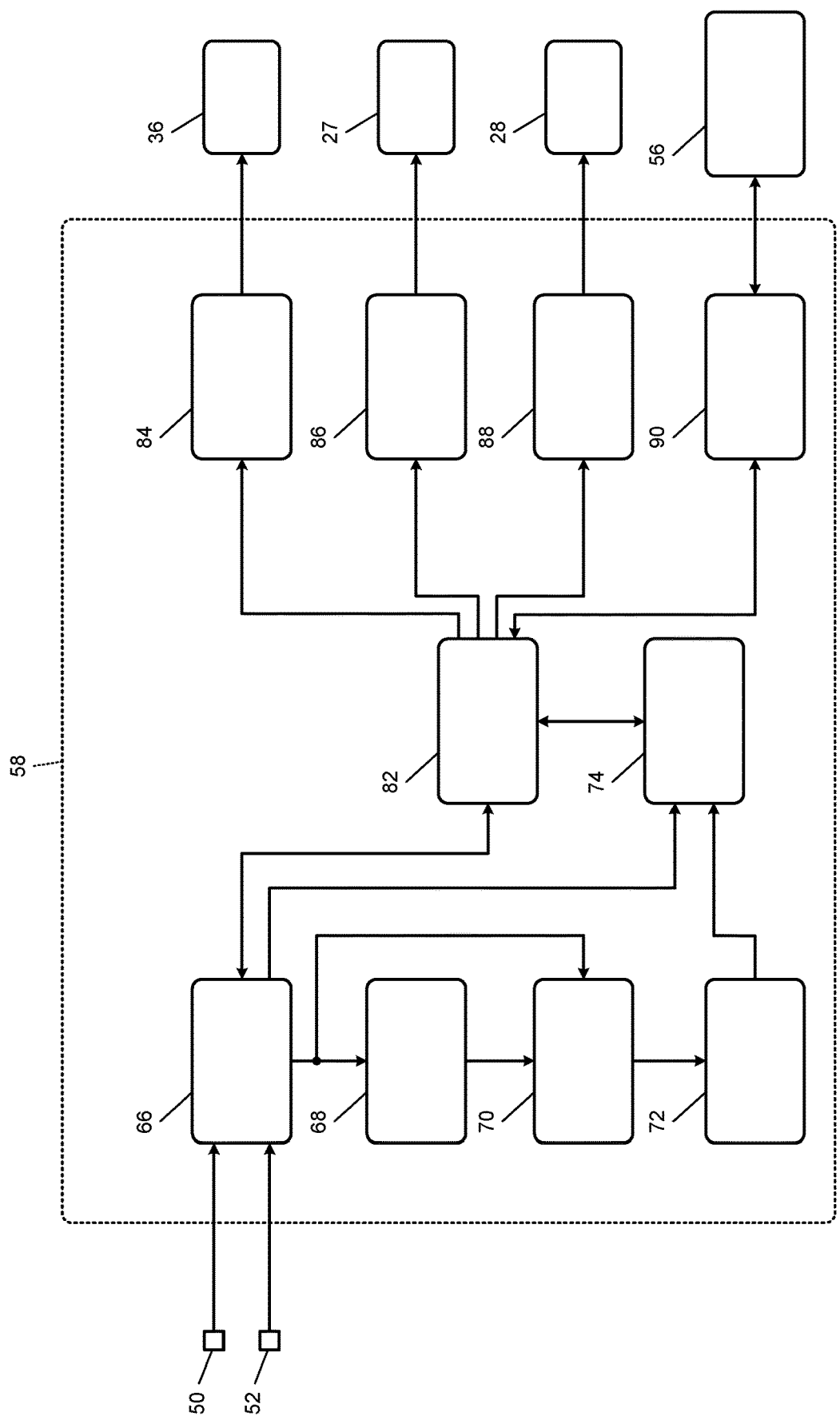
FIG. 2 is a functional block diagram of an example control system according to the principles of the present disclosure.

Referring now to FIG. 2, an example implementation of the vehicle control module 58 includes a data recording module 66, an oscillation frequency module 68, a filtering module 70, a damping ratio module 72, and a critical speed module 74. The data recording module 66 records or stores the vehicle speeds and yaw rates measured by the wheel speed sensor 50 and yaw rate sensor 52 during each yaw maneuver. The data recording module 66 generates a vehicle speed signal indicating vehicle speeds measured by the wheel speed sensor 50 during each yaw maneuver. The data recording module 66 generates a yaw rate signal indicating yaw rates measured by the yaw rate sensor 52 during each yaw maneuver. The data recording module 66 outputs the vehicle speed signal and the yaw rate signal.

The oscillation frequency module 68 determines the frequencies of oscillations in the yaw rate signal for each yaw maneuver. In one example, the oscillation frequency module 68 applies a fast Fourier transform to the yaw rate signal in order to obtain the oscillation frequencies. The oscillation frequency module 68 generates and outputs an oscillation frequency signal indicating the oscillation frequencies for each yaw maneuver.

The filtering module 70 applies a band-pass filter to the yaw rate signal to eliminate undesired noise therefrom. The filtering module 70 may determine upper and lower limits of the band-pass filter based on the oscillation frequencies calculated by the oscillation frequency module 68. Additionally or alternatively, the upper and lower limits of the band-pass filter may be predetermined. In one example, applying the band-pass filter to the yaw rate signal may eliminate oscillation frequencies that are less than 1 Hertz (Hz) and greater than 2 Hz. Thus, the filtered yaw rate signal may only include oscillation frequencies between 1 Hz and 2 Hz, inclusive. The filtering module 70 outputs the filtered yaw rate signal.

The damping ratio module 72 calculates a damping ratio of the system 10 during each yaw maneuver based on the yaw rates measured during that yaw maneuver. The damping ratio indicates how (e.g., the rate at which) the sway motions of the trailer 14 (i.e., the oscillations of the trailer 14 in the yaw direction 64) decay after the disturbance that caused the yaw maneuver. In one example, the damping ratio module 72 uses a logarithmic decrement method to calculate the damping ratio of each filtered yaw rate signal. In another example, the damping ratio module 72 finds the optimal damping ratio that matches the measured (or raw) yaw rate signal. The damping ratio module 72 outputs the damping ratio for each yaw maneuver.

In various implementations, the damping ratio module 72 may calculate the damping ratio of the system 10 based on one or more operating parameters of the vehicle 12 and/or the trailer 14 measured during each yaw maneuver instead of or in addition to the yaw rate of the vehicle 12. These operating parameters may include the yaw rate of the trailer 14, a lateral acceleration of the vehicle 12, a lateral acceleration of the trailer 14, a heading angle of the vehicle 12, and/or a hitch angle 76 (FIG. 1) between a longitudinal axis 78 of the vehicle 12 and a longitudinal axis 80 of the trailer 14. The damping ratio module 72 may calculate the damping ratio based on one or more of these parameters in the same way that the damping ratio module 72 calculates the damping ratio based on the yaw rate of the vehicle 12.

The critical speed module 74 predicts or estimates the critical speed of the vehicle 12 based on the damping ratios for at least two yaw maneuvers and the average speed of the vehicle 12 during each yaw maneuver. As discussed above, the critical speed of the vehicle 12 is the lowest vehicle speed at which the damping ratio of the system 10 is less than the predetermined value. Thus, the damping ratio is greater than or equal to the predetermined value when the vehicle speed is less than the critical speed, and the damping ratio is less than the predetermined value when the vehicle speed is greater than or equal to the critical speed. In one example, the critical speed module 74 determines a function that characterizes the relationships between the damping ratios and the average vehicle speeds for all of the yaw maneuvers. The critical speed module 74 then uses the function to calculate the critical speed. The critical speed module 74 outputs the critical speed.

The example implementation of the vehicle control module 58 shown in FIG. 2 further includes a test procedure module 82, a steering control module 84, a brake control module 86, a motor control module 88, and a user interface device (UID) control module 90. The test procedure module 82 sends instructions to other modules in the vehicle control module 58 to perform a sway test to evaluate the tendency of the trailer 14 to sway. The test procedure module 82 may initiate the sway test by sending an instruction to the steering control module 84, the brake control module 86, and/or the motor control module 88 to apply an impulse disturbance that causes a yaw maneuver. The test procedure module 82 may initiate the sway test based on driving conditions and/or a driver input received through the user interface device 56 and the UID control module 90. The test procedure module 82 outputs the result of the sway test to the UID control module 90.

The steering control module 84 steers the vehicle 12 by controlling the steering actuator 36 to adjust a steering angle 89 (FIG. 1) of the vehicle 12. The steering control module 84 steers the vehicle 12 in response to the angular position of the steering wheel 30 measured by the steering wheel position sensor 49. In addition, the steering control module 84 may steer the vehicle 12 in response to an instruction from the test procedure module 82 to apply an impulse disturbance that causes the vehicle 12 to perform a yaw maneuver. For example, if the steering system 24 is operable to turn the left and right front wheels 20 and 21, the steering control module 84 may control the steering actuator 36 to adjust the steering angle 89 by about 60 degrees for about 0.4 seconds. In another example, if the steering system 24 is operable to turn the left and right rear wheels 22 and 23, the steering control module 84 may control the steering actuator 36 to adjust the steering angle 89 by about 3 degrees for about 0.4 seconds.

The brake control module 86 decreases the speed of the vehicle 12 by applying the friction brakes 27. The brake control module 86 decreases the speed of the vehicle in response to a position of a brake pedal (not shown) of the vehicle 12. In addition, the brake control module 86 may apply one or both of the friction brakes 27 in response to an instruction from the test procedure module 82 to apply an impulse disturbance that causes the vehicle 12 to perform a yaw maneuver. For example, the brake control module 86 may control the friction brakes 27 to apply a greater magnitude of braking on the left rear wheel 22 while applying a lesser magnitude of braking on the right rear wheel 23 in order to initiate a yaw maneuver. This method of braking may be referred to as differential braking. In one example, the brake control module 86 controls the friction brakes 27 to apply a braking torque of 500 Nm for 0.4 seconds on one of the rear wheels 22, 23 while not applying any braking torque to the other one of the rear wheels 22, 23.

The motor control module 88 adjusts the speed of the vehicle 12 by adjusting the output of the electric motors 28. The motor control module 88 adjusts the speed of the vehicle 12 based on a position of accelerator pedal (not shown) of the vehicle 12. In addition, the motor control module 88 may control one or both of the electric motors 28 in response to an instruction from the test procedure model 82 to apply an impulse disturbance that causes the vehicle 12 to perform a yaw maneuver. For example, the motor control module 88 may control the electric motors 28 to output a greater magnitude of torque on the left rear wheel 22 while outputting a lesser magnitude of torque on the right rear wheel 23 to initiate a yaw maneuver. This method of generating torque may be referred to as torque vectoring. In one example, the motor control module 88 controls the electric motors 28 to apply a motor torque of 500 Nm for 0.4 seconds on one of the rear wheels 22, 23 while not applying any motor torque to the other one of the rear wheels 22, 23.

The UID control module 90 controls the user interface device 56 to generate a message indicating the results of the sway test. For example, the message may indicate the critical speed estimated by the critical speed module 74. Additionally or alternatively, the message may instruct the driver of the vehicle 12 to inspect the vehicle 12 and/or the trailer 14 when the critical speed is less than a first predetermined speed (e.g., 30 miles per hour (mph)). Additionally or alternatively, the message may instruct the driver of the vehicle 12 to inspect the vehicle 12 and/or the trailer 14 when the damping ratio of the system 10 is less than the predetermined value.

The UID control module 90 may control the user interface device 56 to adjust the color of the critical speed based on the magnitude thereof. For example, if the critical speed is less than the first predetermined speed, the UID control module 90 may control the user interface device 56 to display a first text message indicating that the trailer 14 may sway above the critical speed with the critical speed in a red color. In addition, the UID control module 90 may control the user interface device 56 to display a second text message instructing the driver to check the installation of the trailer 14. If the critical speed is greater than the first predetermined speed and less than a second predetermined speed (e.g., 80 mph), the UID control module 90 may control the user interface device 56 to display the first text message with the critical speed in a yellow color. If the critical speed is greater than the second predetermined speed, the UID control module 90 may control the user interface device 56 to display the critical speed in a green color.

The UID control module 90 may also relay commands from the user interface device 56 to the test procedure module 82. For example, the driver of the vehicle 12 may initiate the sway test by touching an icon on a touchscreen of the user interface device 56. In turn, the user interface device 56 may generate an instruction to initiate the sway test, and the UID control module 90 may relay instruction to the test procedure module 82.

In one example, before a sway test, the UID control module 90 controls the user interface device 56 to display a text message asking whether the driver would like to perform a critical speed prediction maneuver. During the sway test, the UID control module 90 controls the user interface device 56 to display a text message indicating that critical speed testing is being conducted. In another example, before a sway test, the UID control module 90 controls the user interface device 56 to display buttons (e.g., yes or no) along with a text message asking the driver to (i) confirm that a sway test should be conducted or (ii) initiate a sway test.

Figure 3:
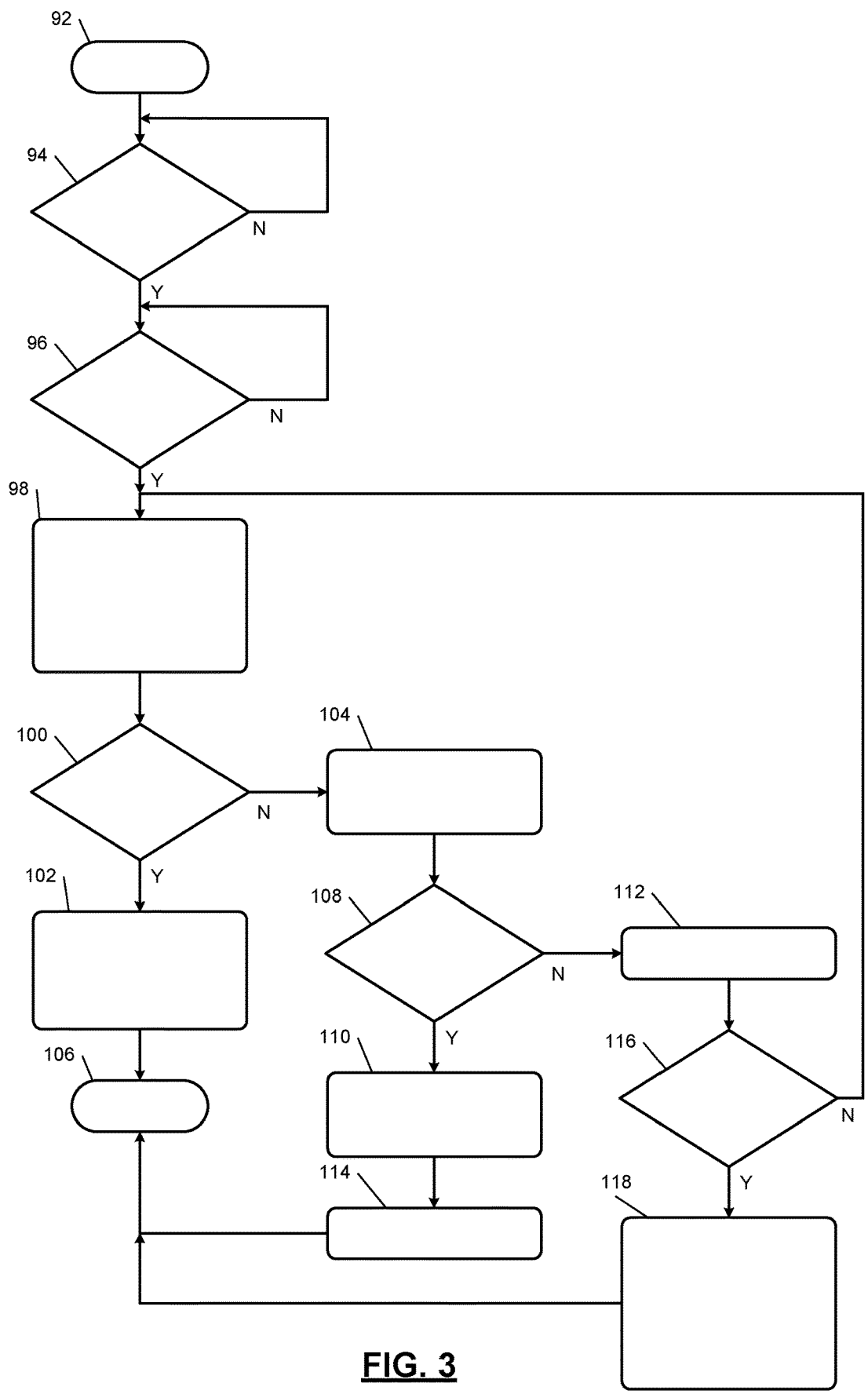
FIGS. 3 through 5 are flowcharts illustrating an example method for evaluating vehicle-trailer combinations for trailer sway potential using active yaw maneuver.

Referring now to FIG. 3, an example method for performing a sway test to evaluate the potential of the trailer 14 to sway begins at 92. In one example, the method begins when an ignition switch (not shown) of the vehicle 12 is adjusted from an off position to an on or start position. At 94, the test procedure module 82 determines whether the period that has elapsed since the method began (e.g., since the ignition switch was adjusted to the on position) is greater than or equal to a predetermined period (e.g., a period within a range from 5 minutes to 10 minutes). If the elapsed period is greater than or equal to the predetermined period, the method continues at 96. Otherwise, the method remains at 94.

At 96, the test procedure module 82 determines whether the driver of the vehicle 12 initiated the sway test. The test procedure module 82 may determine that the driver initiated the sway test when the UID control module 90 outputs a signal indicating the same. If the driver initiated the sway test, the method continues at 98. Otherwise, the method remains at 96.

In various implementations, instead of determining whether the driver initiated the sway test, the test procedure module 82 may initiate the sway test based on driving conditions (e.g., trailer load, weather). For example, the test procedure module 82 may initiate the sway test when the trailer load is greater than a predetermined weight. In another example, the test procedure module 82 may initiate the sway test when a road on which the vehicle is traveling is likely to be dry (e.g., when there is no precipitation).

At 98, the test procedure module 82 sends instructions to other modules in the vehicle control module 58 to perform the sway test. In response, the other modules run an active test procedure by controlling the vehicle 12 to perform multiple yaw maneuvers, collecting data during each yaw maneuver, and calculating a damping ratio for each yaw maneuver based on the data. The data may include yaw rates of the vehicle 12, yaw rates of the trailer 14, lateral accelerations of the vehicle 12, lateral accelerations of the trailer 14, heading angles of the vehicle 12, and/or multiple values of the hitch angle 76.

At 100, the test procedure module 82 determines whether the sway test has been aborted. In one example, the test procedure module 82 aborts the sway test when the damping ratio is less than the predetermined value. If testing is aborted, the method continues at 102. Otherwise, the method continues at 104.

At 102, the UID control module 90 generates a message instructing the driver to inspect the vehicle 12 and/or the trailer 14. For example, the message may instruct the driver to check whether cargo is located at the rear end of the trailer 14 and/or whether the tires of the trailer 14 are worn or have low pressure. At 104, the critical speed module 74 estimates the critical speed of the vehicle 12 corresponding to the onset of undesired sway of the trailer 14. As discussed above, the critical speed module 74 may do this by first determining a function that characterizes the relationship between the damping ratio and the average vehicle speed during each yaw maneuver. In one example, the critical speed module 74 determines the function using a fitting method such as least squares. The critical speed module 74 then uses the function to calculate the critical speed.

At 108, the critical speed module 74 determines whether a fitting error (e.g., an R-squared value) of the function is less than a threshold (e.g., a predetermined value). If the fitting error is less than the threshold, the method continues at 110. Otherwise, the method continues at 112.

At 110, the critical speed module 74 outputs the critical speed to other modules of the vehicle control module 58, and the UID control module 90 controls the user interface device 56 to notify the driver of the vehicle 12 of the critical speed. At 114, the test procedure module 82 sets a counter n equal to zero. At 112, the test procedure module 82 increments the counter n by one. The counter n represents the number of times that the critical speed module 74 has estimated the critical speed using a function with a fitting error that is greater than the threshold.

At 116, the test procedure module 82 determines whether the counter n is greater than a predetermined integer N (e.g., 3). If the counter n is greater than the predetermined integer N, the method continues at 118. Otherwise, the method returns to 98. At 118, the UID control module 90 notifies the driver that the sway test cannot be completed and instructs the driver to check installation of the trailer 14 and to check for hardware faults such as sensor faults. The method ends at 106.

Figure 4:
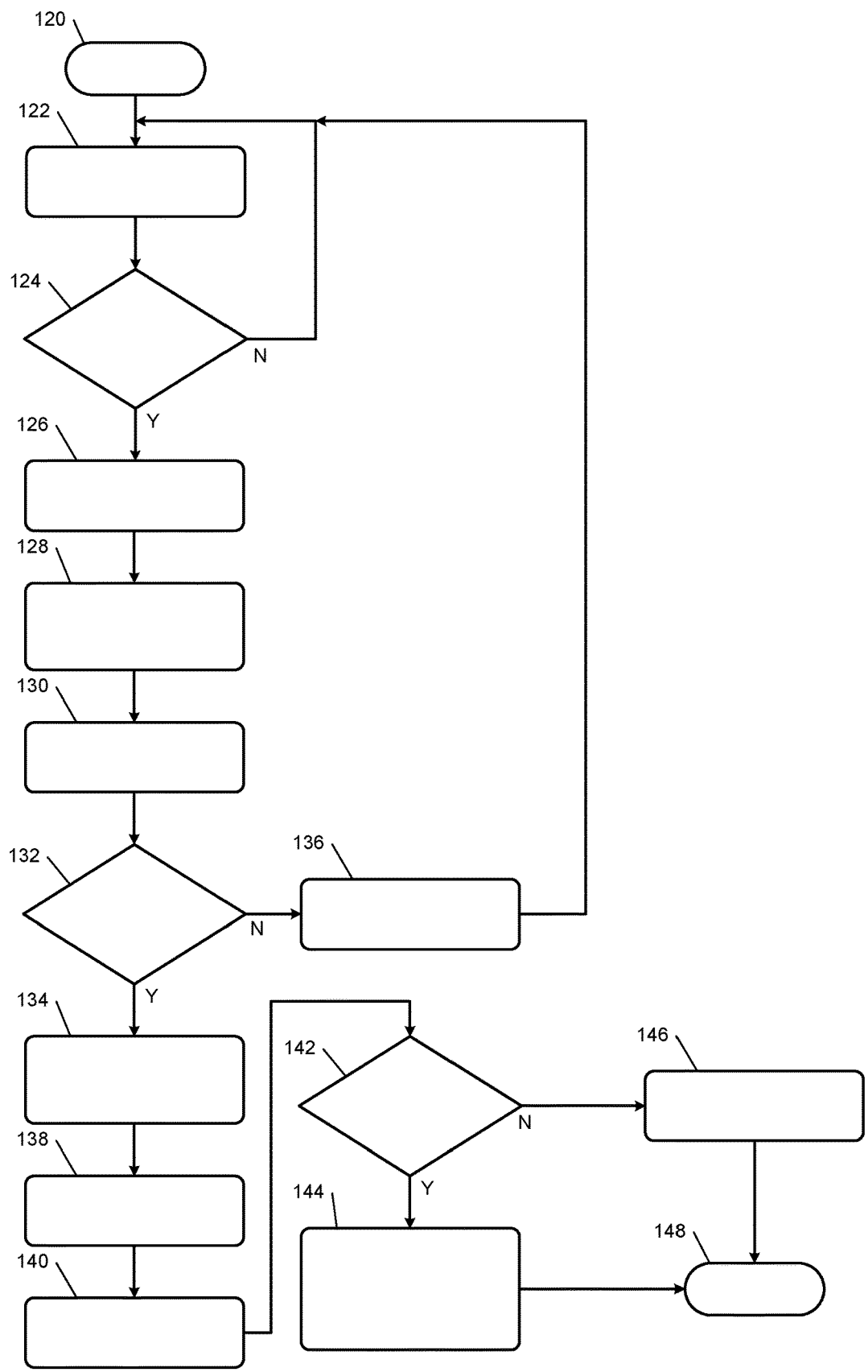

Referring now to FIG. 4, an example method for controlling the vehicle 12 to perform multiple yaw maneuvers, collecting data during each yaw maneuver, and calculating a damping ratio for each yaw maneuver based on the data begins at 120. The method of FIG. 4 may be executed in conjunction with the method of FIG. 3. For example, the method of FIG. 4 includes examples of 98, 100, and 102 of FIG. 3.

At 122, the brake control module 86 and/or the motor control module 88 control the friction brakes 27 and/or the electric motors 28, respectively, to adjust the speed of the vehicle 12 to a test speed. The test speed may be predetermined. In various implementations, the vehicle 12 may include an engine (not shown), and the vehicle control module 58 may include an engine control module (not shown). In these implementations, the engine control module may control the engine to adjust the vehicle speed to the test speed.

At 124, the test procedure module 82 determines whether the vehicle speed is within a predetermined range of the test speed. If the vehicle speed is within the predetermined range of the test speed, the method continues at 126. Otherwise, the method returns to 122. In various implementations, instead of actively adjusting the vehicle speed to the test speed at 122, 122 may be omitted, and the test procedure module 82 may simply wait for the vehicle speed to be within the predetermined range of the test speed during normal driving (e.g., controlling the vehicle speed based on driver input).

The test procedure module 82 may select the test speed from a plurality of predetermined speeds based on how many times the critical speed has been estimated, or the number of times that the method of FIG. 4 has been performed, during the current driving cycle. For example, during the first iteration of the method of FIG. 4, the test speed may be set to a relatively low speed. In the next iteration of the method of FIG. 4, the test speed may be set to a higher speed. The test speed for the first iteration and the increments between the test speeds may be selected to minimize the likelihood that the sway test may induce undesired sway of the trailer 14.

At 126, the test procedure module 82 selects at least one actuator of the vehicle 12 to apply an impulse disturbance that causes the vehicle 12 to perform a yaw maneuver. Each of the friction brakes 27, the electric motors 28 and the steering actuator 36 may be referred to as a vehicle actuator. Similarly, each of the brake control module 86, the motor control module 88, and the steering control module 84 may be referred to as an actuator control module. The test procedure module 82 may select the vehicle actuator for applying the impulse disturbance based on driving conditions. For example, the test procedure module 82 may select the steering actuator 36 if the vehicle 12 is traveling on a dry road surface, and the test procedure module 82 may select the friction brakes 27 if the road surface is wet.

At 128, the actuator control module(s) control(s) the selected vehicle actuator(s) to apply an impulse disturbance that causes the vehicle 12 to perform a yaw maneuver. The magnitude and duration of the impulse disturbance may be selected to ensure that the vehicle 12 stays within its lane during the yaw maneuver. At 130, the data recording module 66 records data during the yaw maneuver for a predetermined period.

In this example, the recorded data includes the vehicle speed and the vehicle yaw rate. Instead of or in addition to recording the vehicle yaw rate, the data recording module 66 may record one or more of the following parameters: the trailer yaw rate, the vehicle lateral acceleration, the trailer lateral acceleration, the vehicle heading angle, and the hitch angle. For each recorded parameter, the data recording module 66 generates a signal indicating the values of the parameter recorded during the predetermined period. In this example, the data recording module 66 generates a vehicle speed signal and a vehicle yaw rate signal.

At 132, the data recording module 66 determines whether the vehicle speed was within the predetermined range of the test speed when the data was recorded by the data recording module 66 (e.g., during the entire predetermined period). If the vehicle speed was within the predetermined range of the test speed when the data was recorded, the method continues at 134. Otherwise, the method continues at 136. At 136, the data recording module 66 discards the data, and then the method returns to 122.

At 134, the oscillation frequency module 68 determines the frequencies of oscillations in the vehicle yaw rate signal and generates an oscillation frequency signal indicating the oscillation frequencies. As noted above, the oscillation frequency module 68 may apply a fast Fourier transform to the yaw rate signal to generate the oscillation frequency signal. At 138, the filtering module 70 applies a band-pass filter to the yaw rate signal to eliminate undesired noise. As discussed above, the filtering module 70 may determine upper and lower frequencies of the band-pass filter based on the oscillation frequencies calculated by the oscillation frequency module 68. At 140, the damping ratio module 72 calculates the damping ratio of the filtered yaw rate signal. As noted above, the damping ratio module 72 may use a logarithmic decrement method to calculate the damping ratio of the filtered signal.

At 142, the test procedure module 82 determines whether the damping ratio is less than a predetermined value (e.g., 0.1). If the damping ratio is less than the predetermined value, the method continues at 144. Otherwise, the method continues at 146.

At 144, the test procedure module 82 aborts the sway test, and the UID control module 90 control the user interface device 56 to notify the driver to inspect the vehicle 12 and the trailer 14. At 146, the critical speed module 74 stores the damping ratio and the average vehicle speed during the predetermined period. The method ends at 148.

Figure 5:
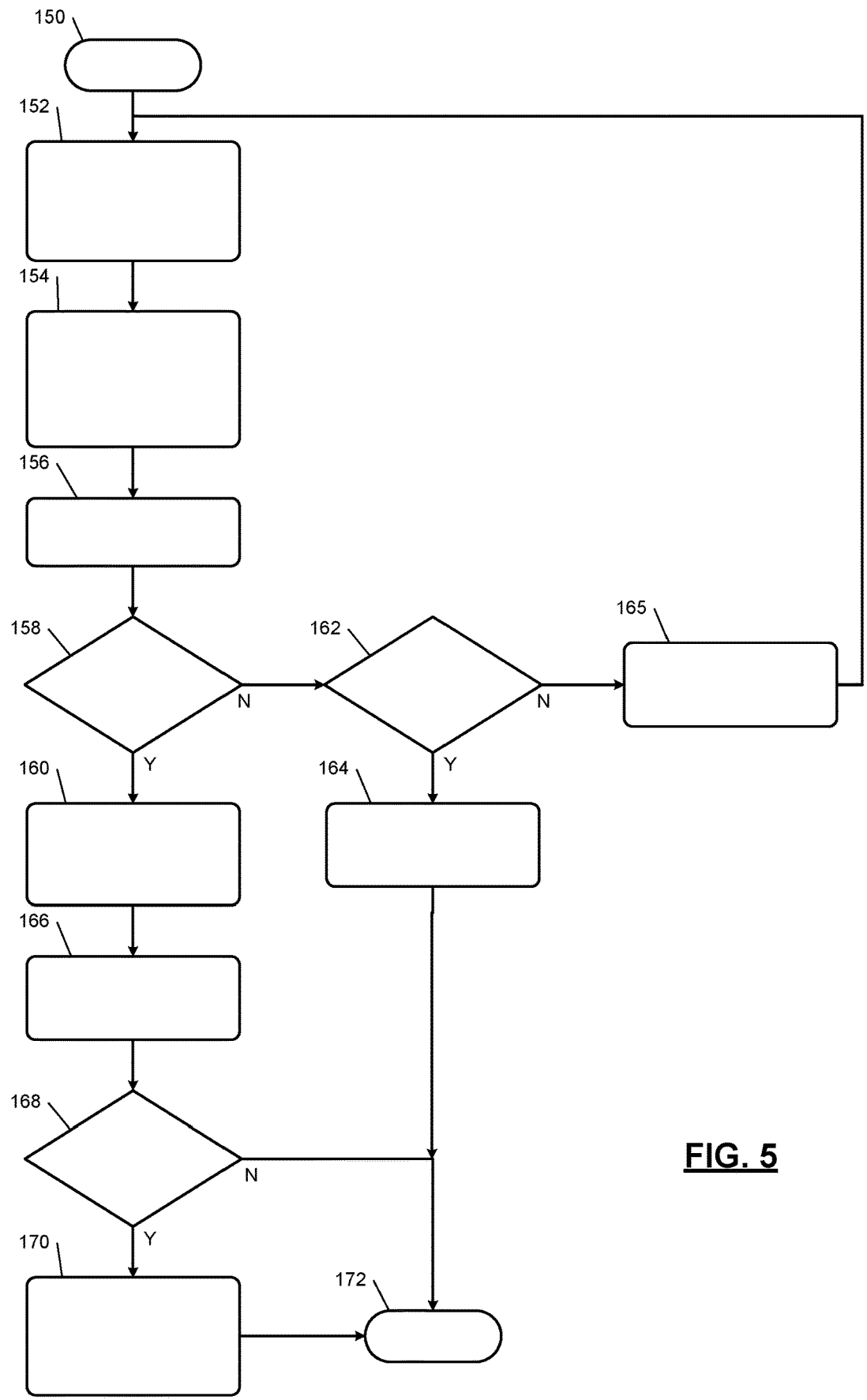

Referring now to FIG. 5, a method for estimating the critical speed of the vehicle 12 begins at 150. The method of FIG. 5 may be executed in conjunction with the method of FIG. 3. For example, the method of FIG. 5 includes examples of 104, 108, 110, 112, 116, and 118 of FIG. 3.

At 152, the critical speed module 74 retrieves the average speed of the vehicle 12 during each yaw maneuver and the corresponding damping ratio. At 154, the critical speed module 74 characterizes the relationships between the average vehicle speed and the damping ratio using a function. For example, a critical speed module 74 may determine a linear or nonlinear function that characterizes a relationship between a first average vehicle speed in a first damping ratio and a relationship between a second average vehicle speed and a second damping ratio. As discussed above, the critical speed module 74 may determine the function using a fitting method such as least squares. At 156, the critical speed module 74 determines a fitting error (e.g., an R-squared value) of the function relative to the damping ratios and the average vehicle speeds.

At 158, the critical speed module 74 determines whether the fitting error is less than the threshold. If the fitting error is less than the threshold, the method continues at 160. Otherwise, the method continues at 162.

At 162, the test procedure module 82 determines whether the number of times that the function has been determined is greater than a predetermined integer N (e.g., 3). If the number of times that the function has been determined is greater than the predetermined integer N, the method continues at 164. Otherwise, the method continues at 165. At 164, the UID control module 90 controls the user interface device 56 instructs the driver to check for hardware faults such as sensor faults. At 165, the test procedure module 82 instructs the data recording module 66 to collect more data at different vehicle speeds.

At 160, the critical speed module 74 determines the critical speed when the ratio is less than the predetermined value. At 166, the critical speed module 74 outputs the critical speed to other modules of the vehicle control module 58, and the UID control module 90 controls the user interface device 56 to notify the driver of the vehicle 12 of the critical speed. At 168, the test procedure module 82 determines whether the critical speed is less than the first predetermined speed. If the critical speed is less than the first predetermined speed, the method continues at 170. Otherwise, the method continues at 172.

At 170, the UID control module 90 generates a message instructing the driver to inspect the vehicle 12 and/or the trailer 14. For example, the message may instruct the driver to check whether cargo is located at the rear end of the trailer 14 and/or whether the tires of the trailer 14 are worn or have low pressure. The method ends at 172.

The methods of FIGS. 3 through 5 are described in the context of the modules of FIG. 2. However, the particular modules that perform the steps of the methods may be different than the modules mentioned in the above descriptions of the methods. Additionally or alternatively, one or more steps of the methods may be implemented apart from the modules of FIG. 2.

Figure 6:
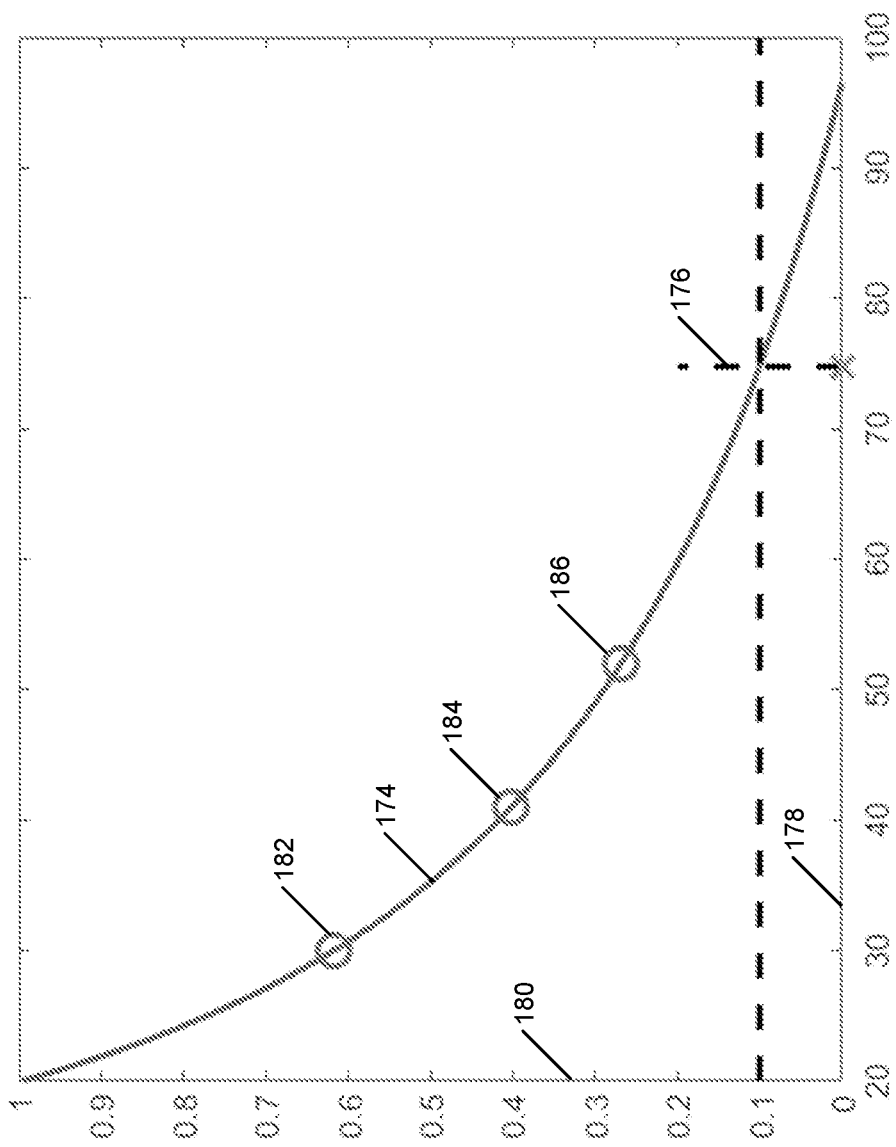
FIG. 6 is a graph illustrating an example function for estimating a vehicle speed corresponding to an onset of undesired trailer sway.

Referring now to FIG. 6, a function 174 for estimating a critical speed 176 of the vehicle 12 is plotted with respect to an x-axis 178 that represents vehicle speed in kilometers per hour (kph) and a y-axis 180 that represents damping ratio. The function 174 is fitted with respect to a first data point 182, a second data point 184, and a third data point 186. Each data point corresponds to a damping ratio and an average vehicle speed during a period of a yaw maneuver when data used to calculate the damping ratio is collected. Each data point corresponds to a unique yaw maneuver. Although the function 174 is fitted with respect to three data points, a function for estimating critical speed according to the present disclosure may be fitted with respect to less than three (e.g., two) data points or more than three (e.g., four) data points.

The first data point 182 corresponds to a damping ratio of about 0.61 and a vehicle speed of about 32 kph. The second data point 184 corresponds to a damping ratio of about 0.41 and a vehicle speed of about 42 kph. The third data point corresponds to a damping ratio of about 0.28 and a vehicle speed of about 53 kph.

As discussed above, the critical speed 176 of the vehicle 12 is the lowest vehicle speed at which the damping ratio of the system 10 is less than the predetermined value. In the example shown in FIG. 6, the predetermined value is 0.1 (as represented by the horizontal dashed line). Therefore, the critical speed 176 is about 75 kph (as represented by the vertical dashed line).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
   an actuator control module configured to control an actuator of a vehicle to cause the vehicle to perform a first yaw maneuver by rotating about its yaw axis when a speed of the vehicle is equal to a first speed, and to perform a second yaw maneuver when speed of the vehicle is at a second speed that is different than the first speed;
   a damping ratio module configured to determine a first damping ratio based on first values of an operating parameter measured during the first yaw maneuver, and to determine a second damping ratio based on second values the operating parameter measured during the second yaw maneuver, wherein the operating parameter includes at least one of a yaw rate of the vehicle, a yaw rate of a trailer connected to the vehicle, a lateral acceleration of the vehicle, a lateral acceleration of the trailer, a heading angle of the vehicle, and a hitch angle between a longitudinal axis of the vehicle and a longitudinal axis of the trailer; and
   a critical speed module configured to estimate a critical speed of the vehicle based on the first and second damping ratios and the first and second speeds, wherein the first damping ratio is less than a predetermined value when the speed of the vehicle is greater than or equal to the critical speed.

2. The system of claim 1 wherein the damping ratio module is configured to determine the first damping ratio based on an operating parameter signal indicating a plurality of the first values of the operating parameter measured during the first yaw maneuver.

3. The system of claim 2 further comprising a filtering module configured to apply a band-pass filter to the operating parameter signal, wherein the damping ratio module is configured to determine the first damping ratio based on the filtered operating parameter signal.

4. The system of claim 3 further comprising an oscillation frequency module configured to generate an oscillation frequency signal indicating a frequency of oscillations in the operating parameter signal, wherein the filtering module is configured to determine upper and lower limits of the band-pass filter based on the oscillation frequency signal.

5. The system of claim 1 wherein the critical speed module is configured to:
   determine a function that characterizes a relationship between the first damping ratio and the first speed and a relationship between the second damping ratio and the second speed; and
   estimate the critical speed of the vehicle using the function.

6. The system of claim 1 further comprising a UID control module configured to control a user interface device to generate a message instructing a driver of the vehicle to inspect at least one of the vehicle and the trader when the critical speed is less than a predetermined speed.

7. The system of claim 1 wherein the actuator control module is configured to select the vehicle actuator from a plurality of actuators of the vehicle based on driving conditions.

8. The system of claim 1 wherein the vehicle actuator includes at least one of a steering actuator, a friction brake, and an electric motor.

9. The system of claim 1 wherein the actuator control module is configured to control the vehicle actuator to cause the vehicle to perform the first yaw maneuver in response to an instruction from a user interface device.

* * * * *